(12) United States Patent
Saraf

(10) Patent No.: US 8,984,704 B2
(45) Date of Patent: Mar. 24, 2015

(54) SOLAR PANEL CLEANING SYSTEM

(71) Applicant: Moshe Saraf, Bat Hefer (IL)

(72) Inventor: Moshe Saraf, Bat Hefer (IL)

( * ) Notice: Subject to any disclaimer, the term of this patent is extended or adjusted under 35 U.S.C. 154(b) by 33 days.

(21) Appl. No.: 14/047,028

(22) Filed: Oct. 7, 2013

(65) Prior Publication Data

US 2014/0109334 A1   Apr. 24, 2014

(30) Foreign Application Priority Data

Oct. 18, 2012   (IL) .......................................... 222558

(51) Int. Cl.
| | | |
|---|---|---|
| *B08B 1/00* | (2006.01) | |
| *F24J 2/46* | (2006.01) | |
| *H01L 31/042* | (2014.01) | |
| *A47L 11/38* | (2006.01) | |
| *B08B 3/02* | (2006.01) | |

(52) U.S. Cl.
CPC ................. *B08B 1/008* (2013.01); *B08B 1/002* (2013.01); *B08B 3/024* (2013.01); *F24J 2/461* (2013.01); *H01L 31/042* (2013.01); *A47L 11/38* (2013.01); *B08B 2240/00* (2013.01); *Y02E 10/40* (2013.01)
USPC .......................................................... 15/246

(58) Field of Classification Search
CPC ........ A47L 11/38; F24J 2/461; H01L 31/042; E04D 3/18
See application file for complete search history.

(56) References Cited

U.S. PATENT DOCUMENTS

| 8,046,101 B2 | 10/2011 | Hisatani |
| 2002/0066473 A1 | 6/2002 | Levy |
| 2010/0000570 A1 | 1/2010 | Mertins |
| 2014/0310906 A1* | 10/2014 | Zanatta ........................... 15/246 |

FOREIGN PATENT DOCUMENTS

| DE | 102010006531 | * | 8/2011 |
| JP | 11-350684 | * | 12/1999 |
| JP | 2004-186632 | * | 7/2004 |
| KR | 10-1034192 | * | 5/2011 |

* cited by examiner

*Primary Examiner* — Mark Spisich
(74) *Attorney, Agent, or Firm* — Garcia-Zamor IP Law; Ruy M. Garcia-Zamor

(57) ABSTRACT

A solar panel cleaning system, comprising: a track, disposed perpendicularly to a plurality of rows of solar panels; a cleaning carriage, comprising a moving mechanism for moving the cleaning carriage along the top and bottom bars of the panels of each of the rows; a conveying carriage, comprising a moving mechanism for conveying thereof along the track, thereby allowing carrying the cleaning carriage from one row to another row; wherein the conveying carriage has a supporting frame on which the cleaning carriage is situated while being moved from one row to another row, and wherein the top bar and the bottom bar of the frame correspond to the top bar and the bottom bar of each of the panels; and a control system, for controlling the movement of the conveying carriage and the movement of the cleaning carriage.

18 Claims, 6 Drawing Sheets

SOLAR PANEL CLEANING SYSTEM

FIELD OF THE INVENTION

The present invention relates to the field of (Photovoltaic) solar panel cleaning. More particularly, the invention relates to a solar panel cleaning system.

BACKGROUND OF THE INVENTION

FIG. 1 pictorially illustrates a solar (photo-voltaic) system, according to the prior art.

Reference numeral 16 denotes a solar system (photo-voltaic) comprising a plurality of rows 36i of panels 12, each panel installed on a frame 14.

The efficiency of a solar system depends on the amount of light reaching the photoelectric cell-voltaic panels. Accumulation of dirt on the panels, such as dust, smog, bird droppings, leaves, and so on, reduces the energy production efficiency of a solar system, and as such, requires cleaning.

As a result of the obstacles of cleaning a solar panel, they are cleaned several times per year, regardless of the dirt accumulated thereon. As such, their energy production efficiency is low. The cleaning is carried out by wet brushing, and puts the cleaning staff in jeopardy.

It is an object of the present invention to provide a solution to the above-mentioned and other problems of the prior art.

Other objects and advantages of the invention will become apparent as the description proceeds.

SUMMARY OF THE INVENTION

A solar panels cleaning system, comprising:
- a track (24), disposed perpendicularly to a plurality of rows (36i) of solar panels (12);
- a cleaning carriage (28), comprising a moving mechanism for moving the cleaning carriage (28) along the top and bottom bars (12a, 12b) of the panels (12) of each of the rows (36i);
- a conveying carriage (26), comprising a moving mechanism for conveying thereof along the track (24), thereby allowing carrying the cleaning carriage (28) from one row (36i) to another row (36j);
- wherein the conveying carriage has a supporting frame (38) on which the cleaning carriage (28) is situated while being moved from one row (36i) to another row (36j), and wherein the top bar (38a) and the bottom bar (38b) of the frame (38) correspond to the top bar (12a) and the bottom bar (12b) of each of the panels (12); and
- a control system, for controlling the movement of the conveying carriage (26) and the movement of the cleaning carriage (28).

Preferably, the cleaning carriage comprises a plurality of wheels (82) disposed therealong, for allowing the carriage to pass from one panel to a subsequent panel of a row, even in the case of a gap between the subsequent panels.

The control system may be adapted to detect a need for cleaning a row of panels by comparing visual characteristic(s) (e.g., reflectivity) of a cleaned area of a panel, to another area of the panel. Thus, the cleaning carriage cleans an area and samples the reflectivity of the cleaned area with the reflectivity of another area of the panel. In this way, if the panel is relatively clean, the control system will not clean its row, thereby saving resources (water, detergent, amortization, and so on).

The control system may be adapted to detect a need for cleaning a row of panels by detecting a decline in electricity production rate of panels of the row.

The control system may be adapted to start a cleaning session according to a schedule.

The system may further comprise conductive straps, for providing electrical power from a domestic power source to the cleaning carriage and the conveying carriage.

According to one embodiment of the invention, at least one of the carriages uses a step motor, and the control system is adapted to calculate the current location of the carriage by counting the steps of the motor. Of course, this is merely an example, and the system may employ other motor types.

According to one embodiment of the invention, the control system uses one or more sensors for detecting the location of a carriage.

The system may further comprise limit switches and corresponding blocks, for detecting an end of a movement course of at least one of the carriages.

According to one embodiment of the invention, the supporting frame (38) is disposed on telescopic poles (50), thereby allowing adjusting a situation of the frame to correspond to the situation (inclination) of the panels of a row.

According to one embodiment of the invention, the track (24) comprises a chain (32) therealong, interlaced in a motor of the conveying carriage, thereby rotating the motor results in moving the conveying carriage.

According to one embodiment of the invention, the cleaning carriage employs a detergent dispenser and brush.

The system may further comprise sprinklers (22) disposed along the rows of panels.

The control system may be further adapted to coordinate the operation of the sprinklers with a cleaning process, thereby saving cleaning materials.

The system may be further adapted to pour distilled water through the sprinklers, thereby preventing or at least detaining the generation of scale.

According to one embodiment of the invention, at least one of the rows comprises extensions (18, 20), for allowing the cleaning carriage to clean the edge of extreme panels of the row.

According to one embodiment of the invention, the cleaning carriage further comprises horizontal wheels (72) at the edges thereof, for keeping the cleaning carriage on the panel (12).

The system may further comprise a shock absorber (46), for stopping the cleaning carriage in the case it does not stop at a planned point.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

BRIEF DESCRIPTION OF THE DRAWINGS

Embodiments and features of the present invention are described herein in conjunction with the following drawings.

It should be understood that the drawings are not necessarily drawn to scale.

DETAILED DESCRIPTION OF PREFERRED EMBODIMENTS

The present invention will be understood from the following detailed description of preferred embodiments, which are meant to be descriptive and not limiting. For the sake of brevity, some well-known features, methods, systems, procedures, components, circuits, and so on, are not described in detail.

Figure 2:
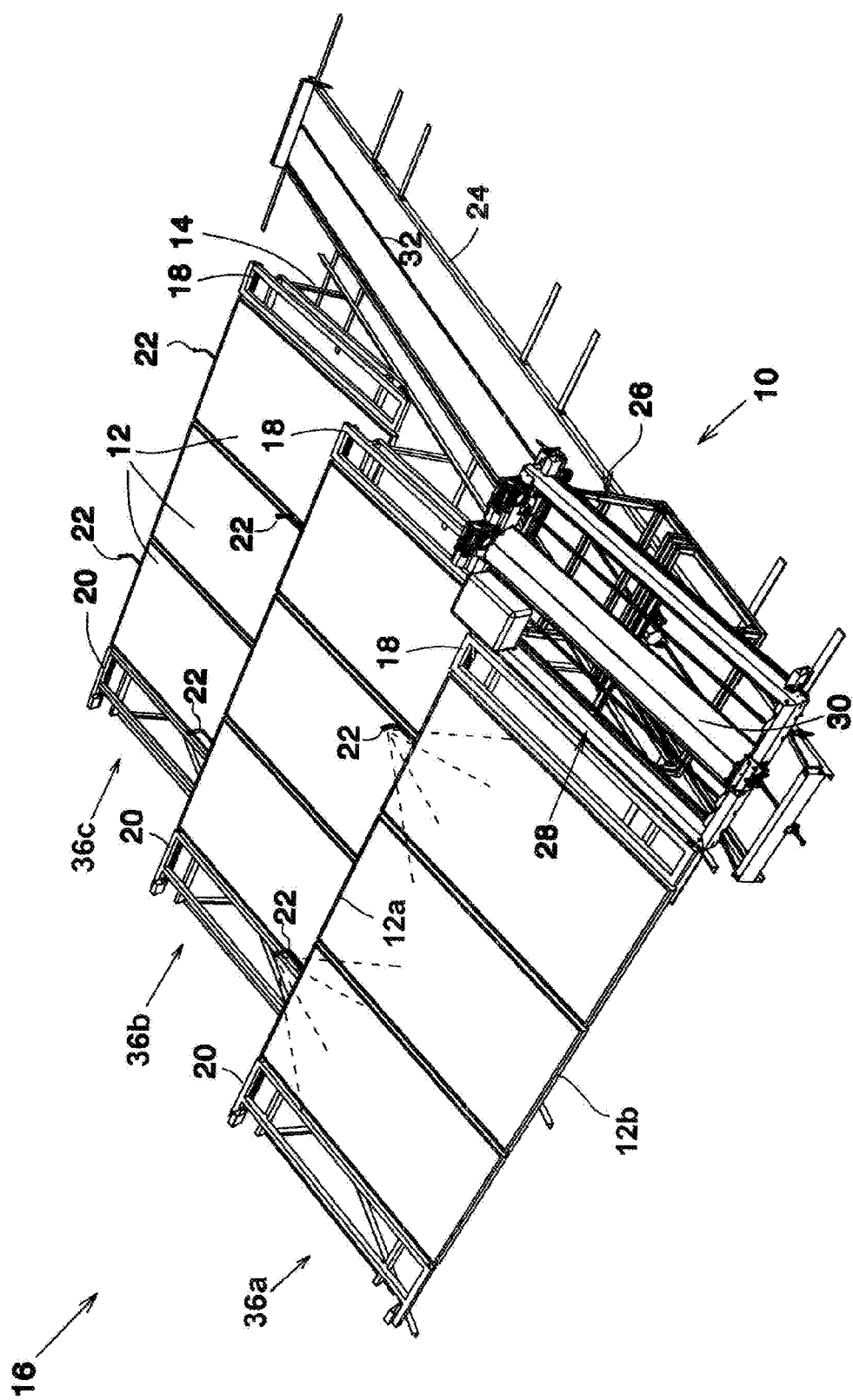
FIG. 2 schematically illustrates a solar (photo-voltaic) system in which is installed a solar panel cleaning system, according to one embodiment of the invention.

FIG. 2 schematically illustrates a solar (photo-voltaic) system in which is installed a solar panel cleaning system, according to one embodiment of the invention.

The solar panel cleaning system, which is marked herein by reference numeral 10 (enumerated in FIG. 3), operates on parallel rows of solar panels, in which one edge of each row is disposed along an imaginary line. The parallel rows of solar panels are marked herein by reference numerals 36a, 36b and 36c.

The system comprises the following essential elements:

a track 24, disposed perpendicularly to a plurality of rows 36i of solar panels 12;

a cleaning carriage 28, comprising a moving mechanism for moving the cleaning carriage 28 along the top and bottom bars 12a and 12b (enumerated in FIG. 3) of the panels 12 of each of the rows 36i;

a conveying carriage 26, comprising a moving mechanism for conveying thereof along the track 24, thereby allowing carrying the cleaning carriage 28 from one row 36i to another row 36j;

wherein the conveying carriage has a supporting frame 38 (enumerated in FIG. 3) on which the cleaning carriage 28 is situated while being moved from one row 36i to another row 36j, and wherein the top bar 38a and the bottom bar 38b (enumerated in FIG. 5) of the frame 38 correspond to the top bar 12a and the bottom bar 12b of each of the panels 12; and a control system, for controlling the movement of the conveying carriage 26 and the movement of the cleaning carriage 28.

Thus, the system moves the conveying carriage 26 on which the cleaning carriage 28 is placed until frame 38 of the conveying carriage 26 aligns with the frame of a solar panel 12 of a row. In this situation, the cleaning carriage 28 moves along the panels of the row, while cleaning the panels. Then it returns to the conveying carriage 26, to be conveyed to another row.

The cleaning is carried out by cleaning means installed on the cleaning carriage 28, using water provided through sprinklers 22 disposed along each of the rows.

Elements 18 and 20 are extension frames, which extends the top 12a and bottom 12b of the panel frames of a row of solar panels. In this way, the center of the cleaning carriage 28 can reach to any point of the panels of a row. Thus, if the brush is disposed in the center of the cleaning carriage, it can reach to any point of the solar panels.

Reference numeral 30 denotes a cover of the cleaning mechanism installed in the cleaning carriage 28.

Reference numeral 32 denotes a chain, for pulling the conveying carriage to reach to a desired location along track 24.

Figure 1:
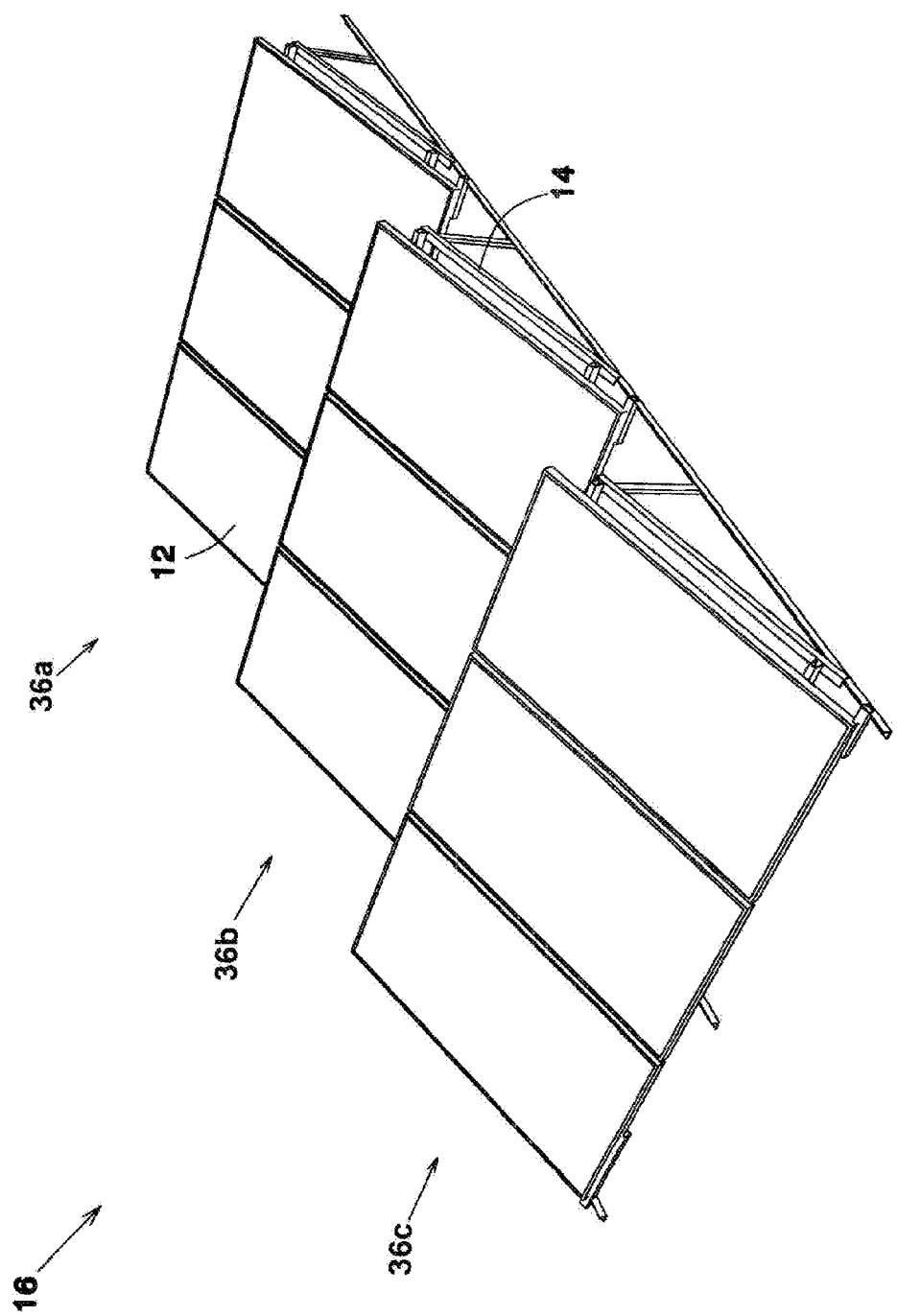
FIG. 1 pictorially illustrates a solar (photo-voltaic) system, according to the prior art.
Figure 3:
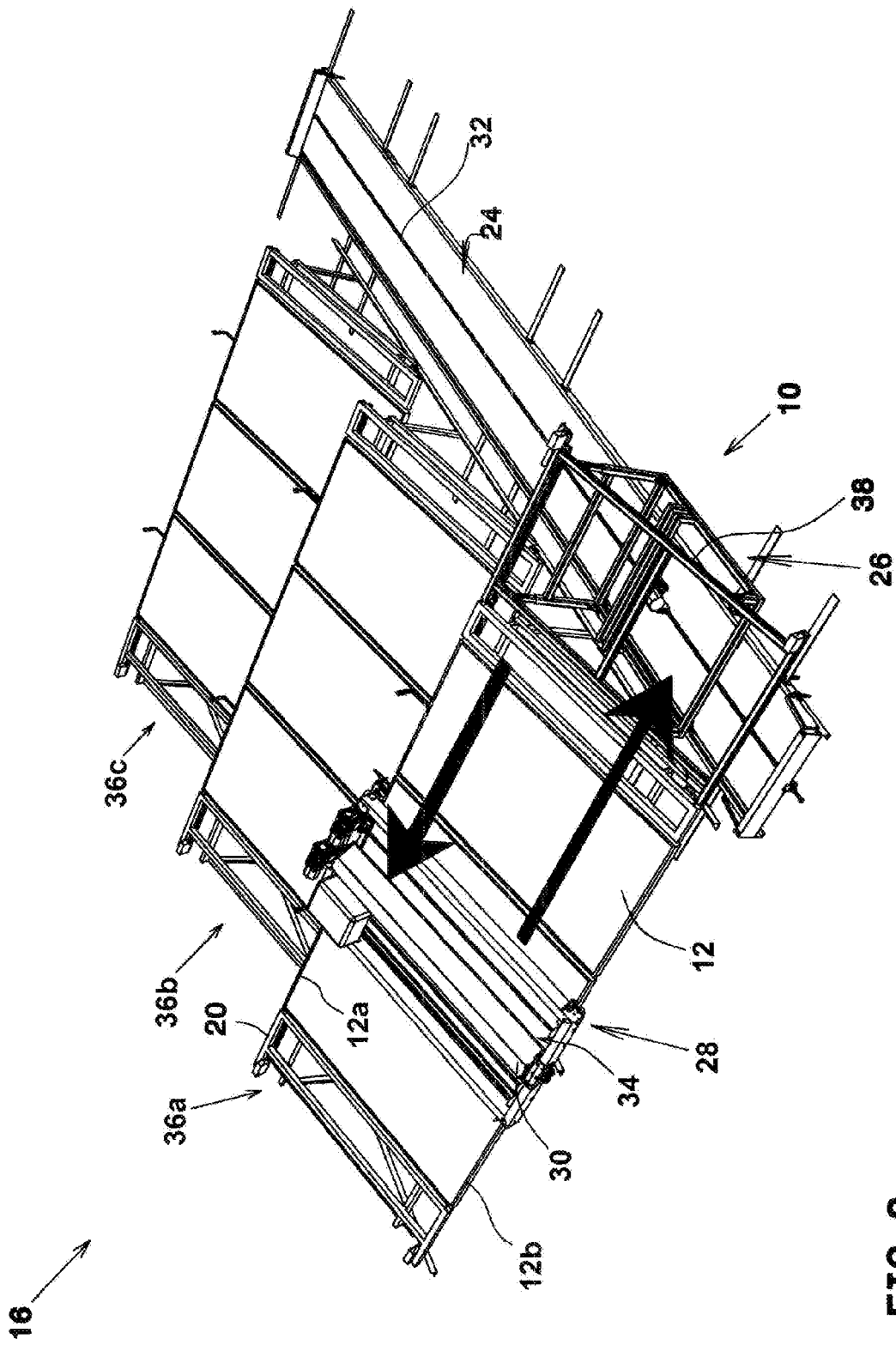
FIG. 3 schematically illustrates the cleaning carriage 28 of FIG. 1 while moving along the solar panels 12 of row 36a of solar panels.

FIG. 3 schematically illustrates the cleaning carriage 28 of FIG. 1 while moving along the solar panels 12 of row 36a of solar panels.

The arrows demonstrate the back and forth movement, while cleaning the solar panels 12 of the row.

Reference numeral 30 denotes a cover of the cleaning mechanism.

Reference numeral 34 denotes a brush of the cleaning mechanism.

Figure 4:
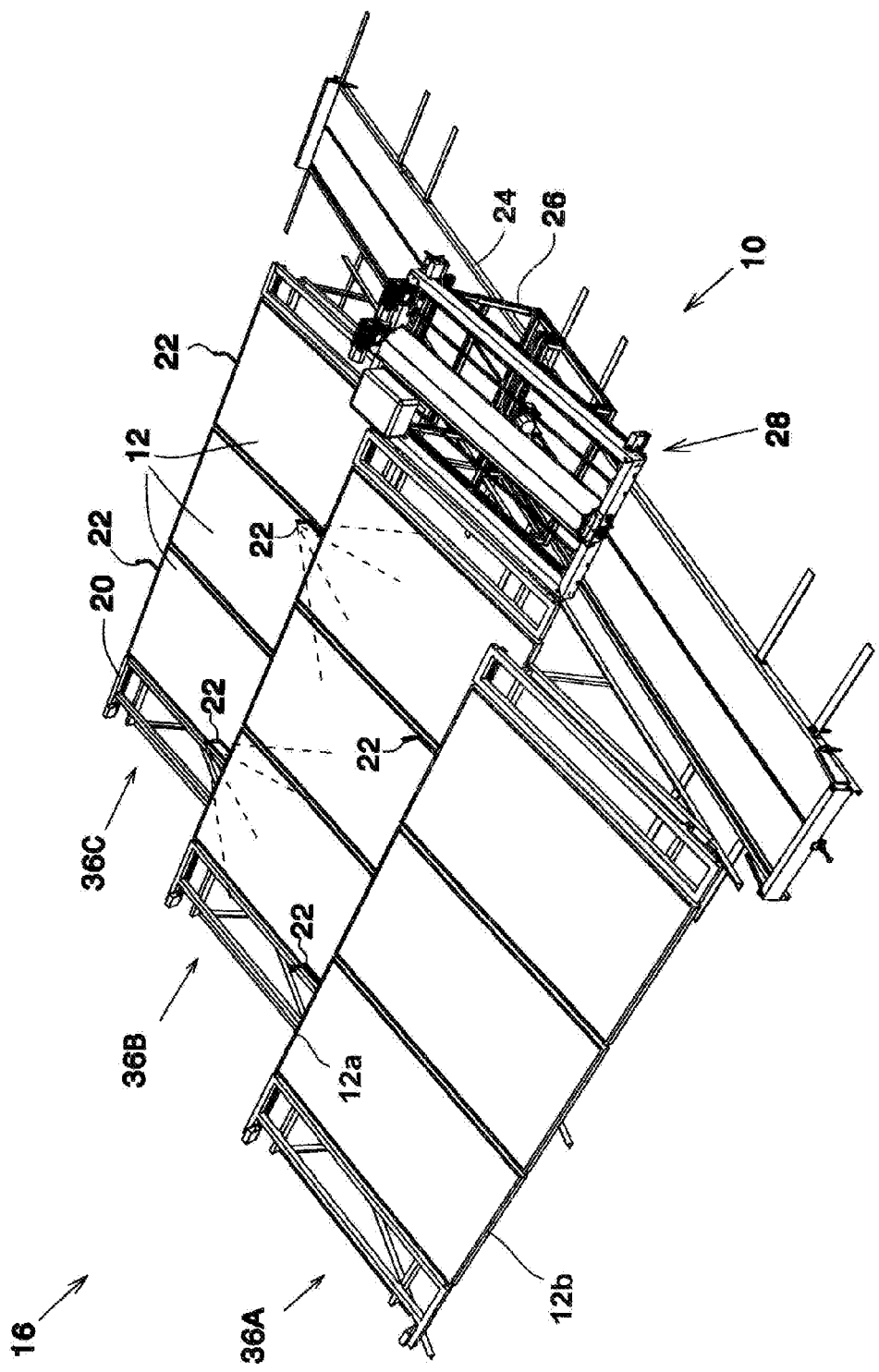
FIG. 4 schematically illustrates the cleaning carriage 28 of FIG. 1 while moving along track 24 from row 36a to row 36b.

FIG. 4 schematically illustrates the cleaning carriage 28 of FIG. 1 while moving along track 24 from row 36a to row 36b.

Figure 5:
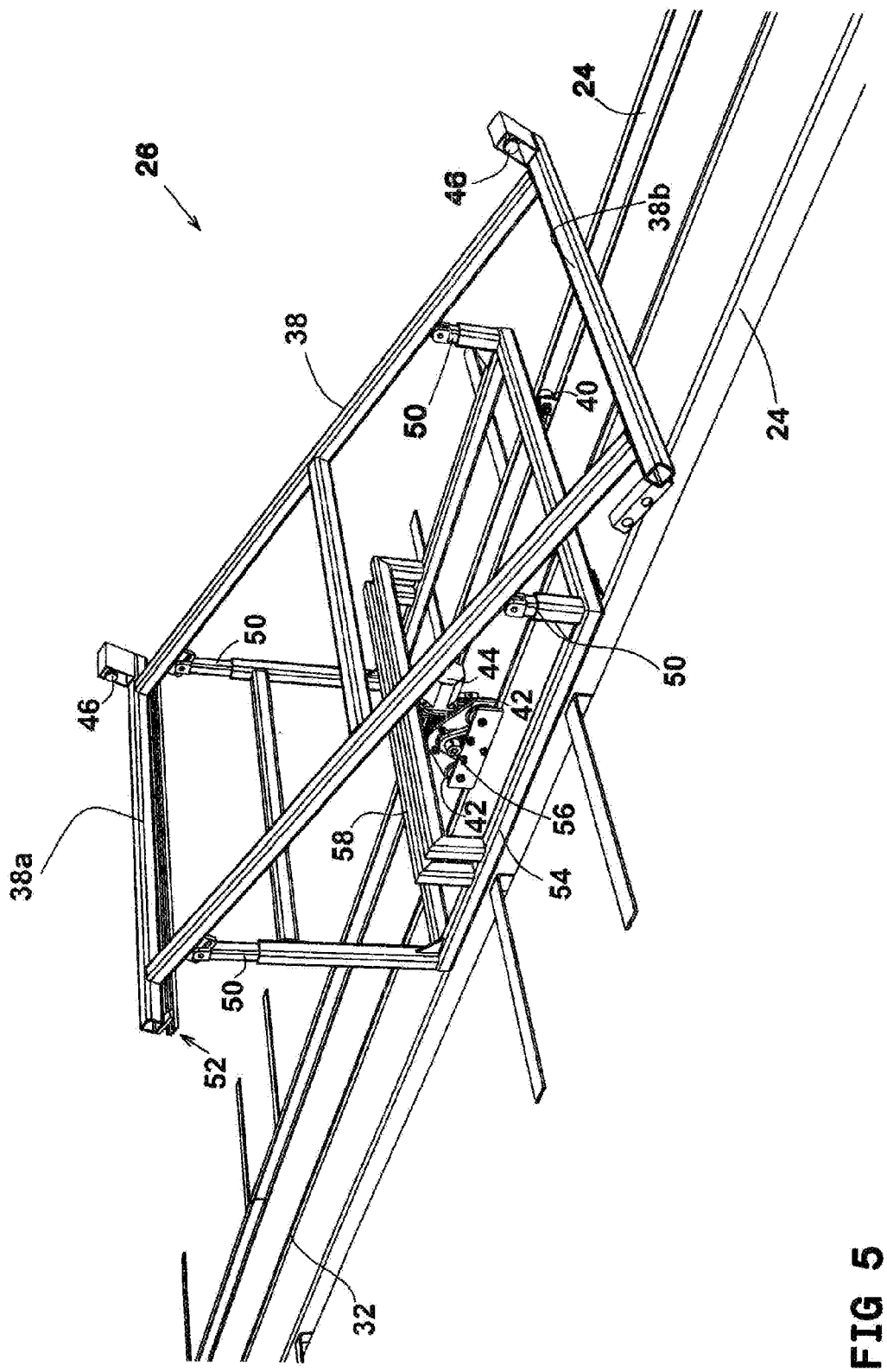
FIG. 5 details the structure of the conveying carriage 26 of FIG. 1.

FIG. 5 details the structure of the conveying carriage 26 of FIG. 1.

The conveying carriage 26 comprises a conveying mechanism, composed of a horizontal frame 54, movable on wheels 40 along track 24. On frame 54 is disposed a bridge 58, on which is installed a motor and a transmission 44, which rotates pulley 56 through which chain 32 passes. Chain 32 is connected between two anchoring points at the edges of track 24. Wheels 42 are used for tensing chain 32. Thus, by rotating pulley 56, carriage 26 moves in a corresponding direction.

The conveying carriage also comprises a supporting structure, composed of a frame 38, disposed on telescopic poles 50, which allow adjusting the angle of the frame.

Reference numeral 46 denotes a shock absorber, for stopping the cleaning carriage should it not stop at the planned point.

Figure 6:
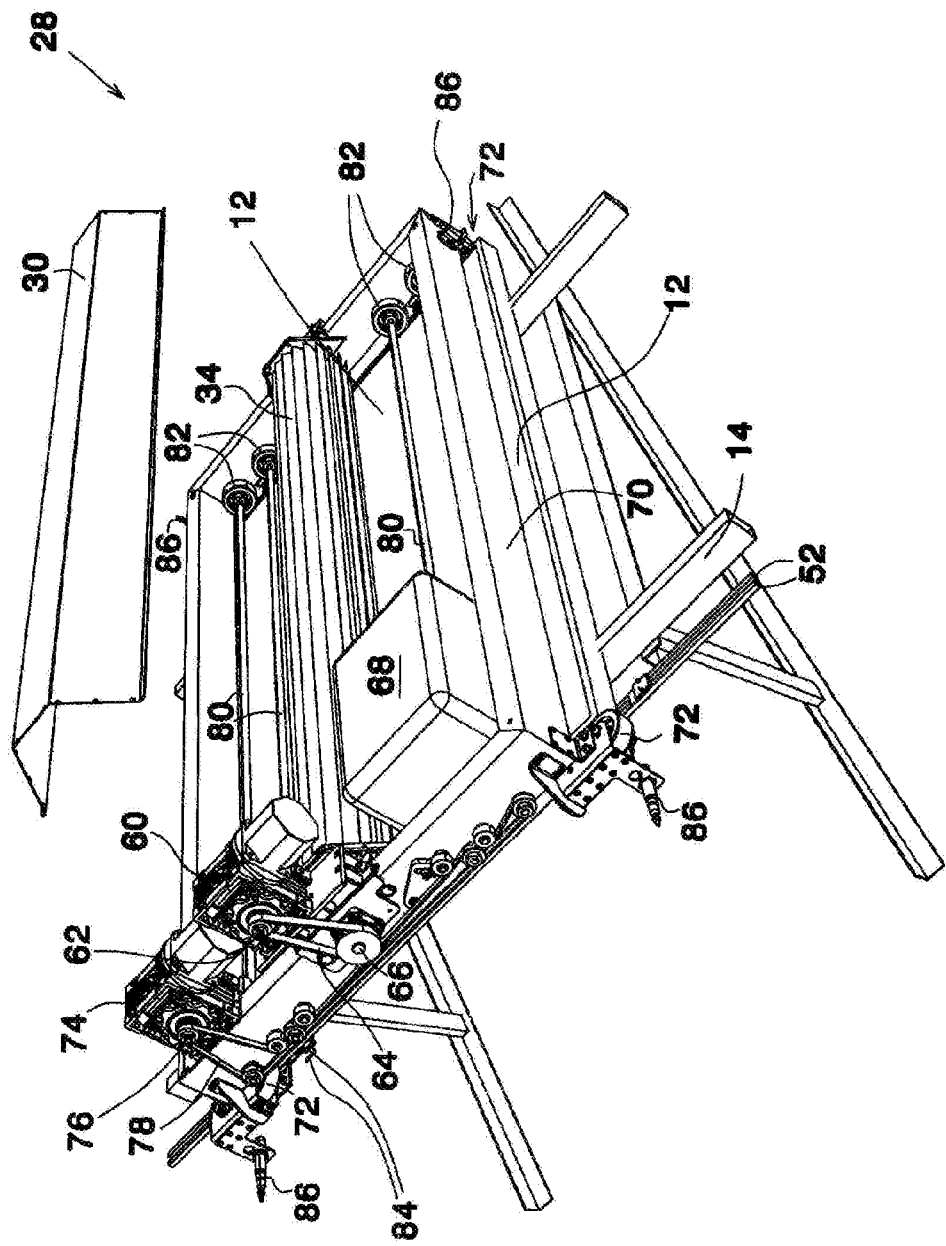
FIG. 6 details the structure of the cleaning carriage 28 of FIG. 1.

FIG. 6 details the structure of the cleaning carriage 28 of FIG. 1.

The cleaning carriage comprises a chassis 70 in the form of a frame. The cleaning system and the convening system are installed on the chassis.

The conveying system of the carriage comprises vertical wheels 82, which are installed on the chassis, and rotatable along a shaft 80. Motor and a gear 74 are rotating shaft 80, thereby rotating wheels 80, resulting in moving the carriage along the edges of solar panel 12.

It should be noted that using a plurality of wheels 82, disposed along the edge of the cleaning carriage, allows the carriage to pass from one panel to a subsequent one even if there is a gap between the panels.

Horizontal wheels 72 keep the carriage on the panel 12, even in case of "severe" inclination of the panels.

Numeral 86 denotes a location sensor. The location sensor may be implemented in various ways. For example, a location sensor may be implemented by a switch and a counter which counts the number of the solar panels the conveying system meets along a row of panels. Thus, by knowing the number of panels in a row, the cleaning carriage can determine if the carriage is stuck, if the carriage has reached the end of a row, and so on. Of course, a more sophisticated mechanism may be employed.

Strap 52 is used for providing electrical power to the cleaning carriage from a domestic power source. The same mechanism sustains also for the conveying carriage.

Reference numeral 60 denotes a motor for moving brush 34; numeral 62 denotes a pulley that rotates strap 64, which rotates shaft 66 of brush 34; and numeral 64 denotes a strap that connects motor 60 to shaft 66 that rotates brush 34.

Reference numeral 76 denotes a pulley rotated by motor 74, the pulley rotates strap 78, which rotate pulley, which rotates shaft 80, which rotate wheels 82, which move the cleaning carriage; reference numeral 68 denotes a control box.

According to one embodiment of the invention, controlling the movement of a carriage is carried out by limit switch 86. For example, the sensors may sense if the carriage has reached to the end of the last panel.

According to yet another embodiment of the invention, at the end of a course of each of the carriages is disposed a block, such that when a carriage reaches to the block, a limit switch (such as the one pointed by reference numeral 86) is turned on.

In the figures and/or description herein, the following reference numerals have been mentioned:

numeral 10 denotes a solar panel cleaning system, according to one embodiment of the invention;
numeral 12 denotes a solar panel;
numeral 12a denotes a top bar of a frame of a solar panel;
numeral 12b denotes a bottom bar of a frame of a solar panel;
numeral 14 denotes a construction on which a panel is disposed;
numeral 16 denotes a solar (photo-voltaic) system;
numeral 18 denotes an extension frame;
numeral 20 denotes another extension frame;
numeral 22 denotes a sprinkler disposed along a row of solar panels;
numeral 24 denotes a track disposed perpendicularly to a row of solar panels, along an imaginary line to which one of the side edges of the rows is justified;
numeral 26 denotes a conveying carriage;
numeral 28 denotes a cleaning carriage;
numeral 30 denotes a cover of a cleaning mechanism installed on cleaning carriage 28;
numeral 32 denotes a chain, for pulling the conveying carriage to reach to a desired location along track 24;
numeral 34 denotes a brush of a cleaning mechanism installed on the cleaning carriage 28;
each of numerals 36a, 36b and 36c denotes a row of solar panels;
each of numerals 36i and 36j denotes a row of solar panels 12, wherein i differs from j;
numeral 38 denotes a frame of conveying carriage 26 on which the cleaning carriage 28 is situated while the conveying carriage moves from one row of panels to another row of panels;
numeral 38a denotes a top bar of frame 38;
numeral 38b denotes a bottom bar of frame 38;
numeral 40 denotes a wheel of the conveying carriage 26, on which the carriage moves along track 24;
numeral 42 denotes a wheel used for tensing chain 32;
numeral 44 denotes a motor and a transmission;
numeral 46 denotes a shock absorber, for blocking the cleaning carriage in case of its not stopping at the planned point;
numeral 50 denotes a telescopic pole for supporting frame 38;
numeral 52 denotes conductive straps, for providing electric power to the cleaning carriage when situated thereon;
numeral 54 denotes a chassis of the conveying carriage 26, in a form of a frame;
numeral 56 denotes a pulley through which chain 32 passes;
numeral 58 denotes a bridge connected to chassis 54;
numeral 60 denotes a motor for moving brush 34;
numeral 62 denotes a pulley that rotates strap 64, which rotates the shaft 66 of brush 34;
numeral 64 denotes a strap that connects motor 60 to shaft 66 that rotates brush 34;
numeral 66 denotes a shaft of brush 34, i.e., by rotating shaft 66, brush 34 rotates as well;
numeral 68 denotes a control box;
numeral 70 denotes a frame, used as a chassis of the cleaning carriage 28;
numeral 72 denotes a horizontal wheel that keeps the cleaning carriage 28 on a frame of a solar panel 12;
numeral 74 denotes a motor and gear;
numeral 76 denotes a pulley rotated by motor 74, the pulley rotates strap 78, which rotates a pulley, which rotates shaft 80, which rotate wheels 82, that move the cleaning carriage;
numeral 78 denotes a strap;
numeral 80 denotes a drive shaft;
numeral 82 denotes a vertical wheel;
numeral 84 denotes a conductive contact with conductive straps 52, thereby sparing the need of conductive cables; and
numeral 86 denotes an end or row sensor.

WO 2012/025527 discloses "a mobile cleaning device (1) suitable for displacing along, and cleaning a series of adjacent tilted solar panels (20) aligned in a row and requiring therefor no superstructure fixed to said row of solar panels." (Abstract) The disclosure discloses a single transportation wheel (10A) as illustrated in FIGS. 8 to 11 of the disclosure, that can be used as wheel barrow to easily move around the device by a single person.

Thus, the disclosure does not teach of two carriages, but rather a single carriage, and the disclosure does not teach on a track perpendicular to the panel rows which allows moving a cleaning carriage from one row to another. Furthermore, the object of element 10A is to allow a user to move a cleaning carriage, on wheel 10A, from one row of panels to the other, like a wheel barrow. Furthermore, the carriages of the present invention move by automation means while the carriage of WO 2012/025527 moves manually.

The foregoing description and illustrations of the embodiments of the invention has been presented for the purposes of illustration. It is not intended to be exhaustive or to limit the invention to the above description in any form.

Any term that has been defined above and used in the claims, should to be interpreted according to this definition.

The reference numbers in the claims are not a part of the claims, but rather used for facilitating the reading thereof. These reference numbers should not be interpreted as limiting the claims in any form.

The invention claimed is:

1. A solar panels cleaning system, comprising:
a track (24), disposed perpendicularly to a plurality of rows (36i) of solar panels (12);
a cleaning carriage (28), comprising a moving mechanism for moving said cleaning carriage (28) along top and bottom bars (12a, 12b) of panels (12) of each of said rows (36i);
a conveying carriage (26), comprising a moving mechanism for conveying thereof along said track (24), thereby allowing carrying the cleaning carriage (28) from one row (36i) to another row (36j);
wherein said conveying carriage has a supporting frame (38) on which the cleaning carriage (28) is situated while being moved from one row (36i) to another row (36j), and wherein a top bar (38a) and a bottom bar (38b) of said frame (38) correspond to a top bar (12a) and a bottom bar (12b) of each of said panels (12); and a control system, for controlling a movement of said conveying carriage (26) and a movement of said cleaning carriage (28).

2. A system according to claim 1, wherein said cleaning carriage comprises a plurality of wheels (82) disposed therealong, for allowing said carriage to pass from one panel to a subsequent panel of a row, should there be a gap between two subsequent panels.

3. A system according to claim 1, wherein said control system is adapted to detect a need for cleaning a row of panels by comparing and analyzing visual characteristic(s) of a panel thereof.

4. A system according to claim 1, wherein said control system is adapted to detect a need for cleaning a row of panels by electricity production rate of panels of said row.

5. A system according to claim 1, wherein said control system is adapted to activate a cleaning session according to a schedule thereof.

6. A system according to claim 1, further comprising conductive straps, for providing electrical power from a domestic power source to the cleaning carriage and the conveying carriage.

7. A system according to claim 1, wherein at least one of the carriages uses a step motor, and said control system is adapted to calculate a current location of said at least one of the carriages by counting the steps of the motor.

8. A system according to claim 1, wherein said control system uses one or more sensors for detecting a location of a carriage.

9. A system according to claim 1, further comprising limit switches and corresponding blocks, for detecting an end of a movement course of at least one of the carriages.

10. A system according to claim 1, wherein said supporting frame (38) is disposed on telescopic poles (50), thereby allowing adjusting a situation of said frame to correspond to a situation of panels of a row.

11. A system according to claim 1, wherein said track (24) comprises a chain (32) therealong, interlaced in a motor of said conveying carriage.

12. A system according to claim 1, further comprising sprinklers (22) disposed along said rows of panels.

13. A system according to claim 12, wherein an operation of said sprinklers (22) is coordinated by said control system with a cleaning process, thereby saving cleaning materials.

14. A system according to claim 12, further adapted to pour distilled water through the sprinklers, thereby preventing generation of scale.

15. A system according to claim 12, wherein an operation of said sprinklers (22) is scheduled according to a cleaning process, thereby saving cleaning materials.

16. A system according to claim 1, wherein at least one of said rows comprises extensions (18, 20), for allowing said cleaning carriage to clean an edge of extreme panels of said row and for matching the heights with the conveying carriage.

17. A system according to claim 1, wherein said cleaning carriage further comprises horizontal wheels (72) at edges thereof, for keeping the cleaning carriage on the panel (12).

18. A system according to claim 1, further comprising a shock absorber (46), for stopping the cleaning carriage should it not stop at a planned point.

\* \* \* \* \*